United States Patent [19]

Ose et al.

[11] Patent Number: 5,170,586
[45] Date of Patent: Dec. 15, 1992

[54] TRIM FOR A VEHICLE

[75] Inventors: Katunari Ose; Tetsuhiro Iwaki, both of Hiroshima, Japan

[73] Assignee: Mazda Motor Corporation, Hiroshima, Japan

[21] Appl. No.: 713,098

[22] Filed: Jun. 11, 1991

[30] Foreign Application Priority Data

Jun. 12, 1990 [JP] Japan ............... 2-62014[U]
Mar. 1, 1991 [JP] Japan ............. 3-010678[U]

[51] Int. Cl.5 ............................................. E05F 11/38
[52] U.S. Cl. ...................................... 49/377; 49/493; 49/495
[58] Field of Search ............... 49/374, 377, 484, 493, 49/494, 495, 502

[56] References Cited

U.S. PATENT DOCUMENTS

| 2,223,459 | 12/1940 | Reid | 49/377 |
|---|---|---|---|
| 2,356,976 | 8/1944 | Conlon | 49/377 X |
| 2,782,069 | 2/1957 | Storch | 49/377 |
| 2,876,003 | 3/1959 | Probst | 49/377 X |
| 3,304,681 | 2/1967 | Wunderlich | 49/377 X |
| 3,763,596 | 10/1973 | Anderson | 49/493 X |
| 4,173,174 | 11/1979 | Vinko et al. | |
| 4,424,647 | 1/1984 | Sasaki et al. | 49/377 X |
| 4,606,149 | 8/1986 | Hamada et al. | 49/377 X |
| 4,696,128 | 9/1987 | Fukuhara | 49/377 X |
| 4,860,494 | 8/1989 | Fujii et al. | 49/377 X |
| 5,040,335 | 8/1991 | Grimes | 49/502 |

FOREIGN PATENT DOCUMENTS

| 209557 | 7/1957 | Australia | 49/377 |
|---|---|---|---|
| 62-167721 | 10/1987 | Japan | |
| 193712 | 7/1990 | Japan | 49/377 |

Primary Examiner—Renee S. Luebke
Assistant Examiner—Jerry Redman
Attorney, Agent, or Firm—Sixbey, Friedman, Leedom & Ferguson

[57] ABSTRACT

A trim for a vehicle having a trim body and a weaterstrip which is in contact with an inner surface of a window glass in an outer side of an upper end of the trim body. A flange part projecting outwardly and extending along the upper end of the trim body is formed at the trim body. A plurality of boss parts are formed integrally with the trim body under the flange part with proper intervals between the boss parts along the upper end of the trim body. The weatherstrip is fixed to the boss parts by bolt members, wherein an inner surface of the weatherstrip contacts with outer ends of the flange part and the boss parts.

6 Claims, 5 Drawing Sheets

TRIM FOR A VEHICLE

BACKGROUND OF THE INVENTION

The present invention relates to a trim for a vehicle such as a door trim and a quarter trim.

A weatherstrip, consisted essentially of an elastic material like a rubber, is provided at an outer side of an upper end of a trim for a vehicle in order to prevent wind, rain, and dust from coming into a passenger compartment. In order to provide rigidity to the weatherstrip, the weatherstrip is constructed by a weatherstrip body and a padding material for supporting the weatherstrip body, and they are formed integrally.

The Japanese Utility Model Registration Laying Open Gazette No. 62-167721 discloses a trim for a vehicle having weatherstrip mounted securely at an outer side of an upper end thereof. This trim for a vehicle has a flange part projecting outwardly at an upper end of the trim and a mounting part, having a penetrating hole, extending downwardly from an end of the flange part. An inner surface of the weatherstrip is connected to an outer surface of the mounting part. An engaging nail projecting to the trim body is provided at an inner surface of the padding material of the weatherstrip. Thus, the weatherstrip is mounted to the trim body by bending the end of the engaging nail.

However, in the above trim for a vehicle, an undercut part is formed at an end of the trim body since the mounting part is formed by extending the flange part downwardly. Accordingly, a forming die requires an insert die, which means complicated structure is required. When forming a trim, a forming resin flows into between the forming die and the insert die. Consequently, this trim has disadvantages such as lower dimensional accuracy of the trim body and higher cost for the forming die.

Also, in the above trim, it is hard to mount the weatherstrip to the trim body since the end of the engaging nail of the weatherstrip pierces through the penetrating hole of the mounting part of the trim body and should be bent in the back surface of the mounting part hunging down from the end of the flange part.

Furthermore, in the above trim for a vehicle, an inner surface of the undercut part of the trim body having the weatherstrip contacts with the outer surface of the door panel (a vehicle body) to determine the position of the trim for a vehicle. When a thickness error occurs in the undercut part, dimensional error occurs between the window glass and the weatherstrip and consequently, seal of the weatherstrip toward the window glass is lowered.

SUMMARY OF THE INVENTION

The objects of the present invention are to improve the accuracy of forming the trim body, to lower the cost for the forming die, to simplify the operation of mounting the weatherstrip to the trim body, to improve the strength to mount the weatherstrip and the trim body, and to improve the seal of the weatherstrip to the window glass.

In order to achieve the above objects, the trim for a vehicle of the present invention comprises a trim body and a weatherstrip which is disposed at an outer side of an upper end of the trim body and provided with lips in contact with an inner surface of the window glass. A flange part projecting outwardly and extending along the upper end of the trim body is formed in the trim body. A plurality of boss parts projecting downwardly are provided at the lower end of the flange part by being formed integrally with the trim body with proper intervals along an upper end of the trim body, which means in a longitudinal direction of a vehicle. The above weatherstrip is fixed to the above boss parts by bolt members, wherein the inner surface of the weatherstrip contact with the outer ends of the flange part and the boss parts.

DESCRIPTION OF THE PREFERRED EMBODIMENT

The preferred embodiment is described below with accompanying drawings.

Figure 1:
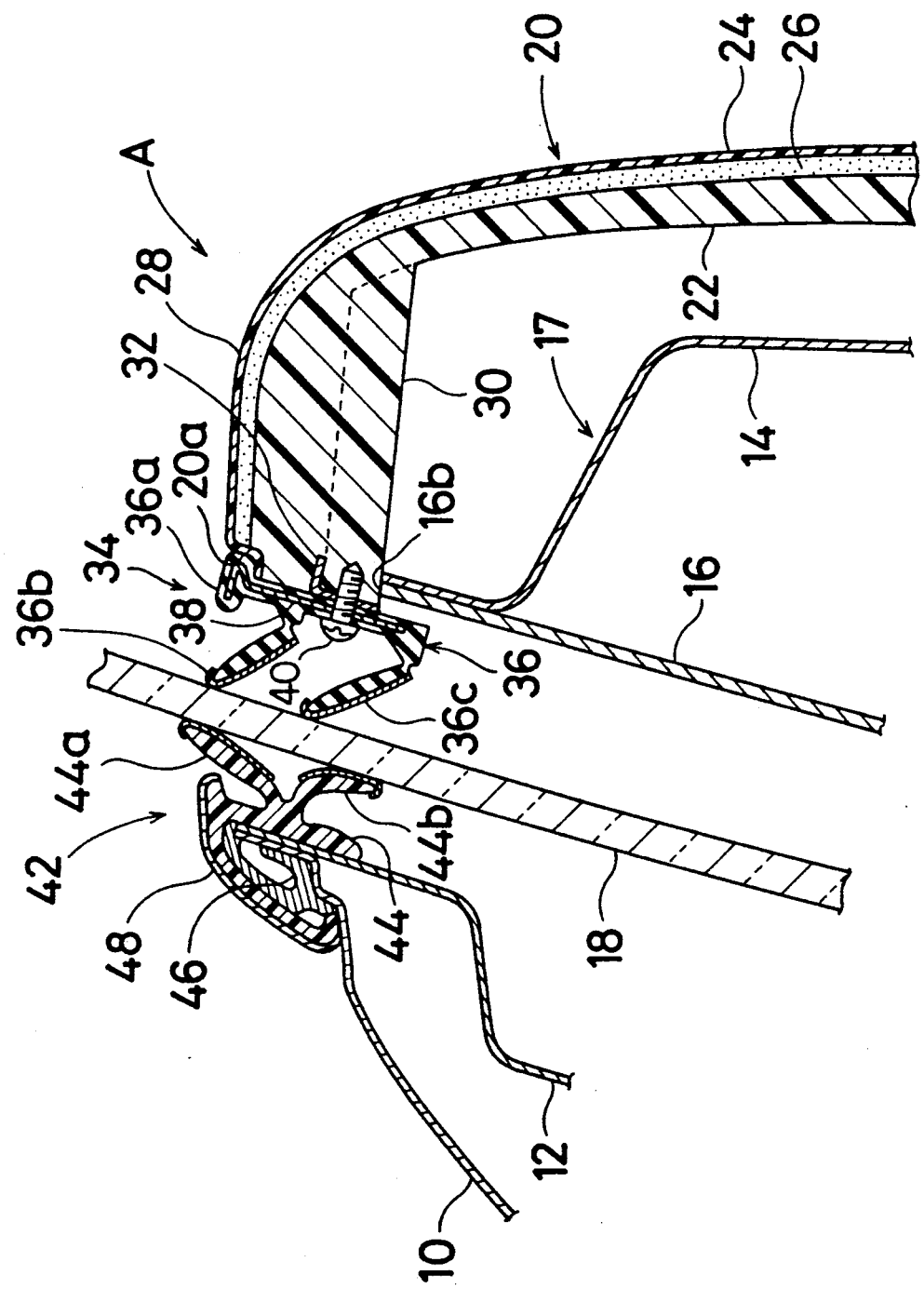
FIG. 1 is a vertical sectional view of a thick-wall projecting part of a trim of a vehicle of a present embodiment.
Figure 2:
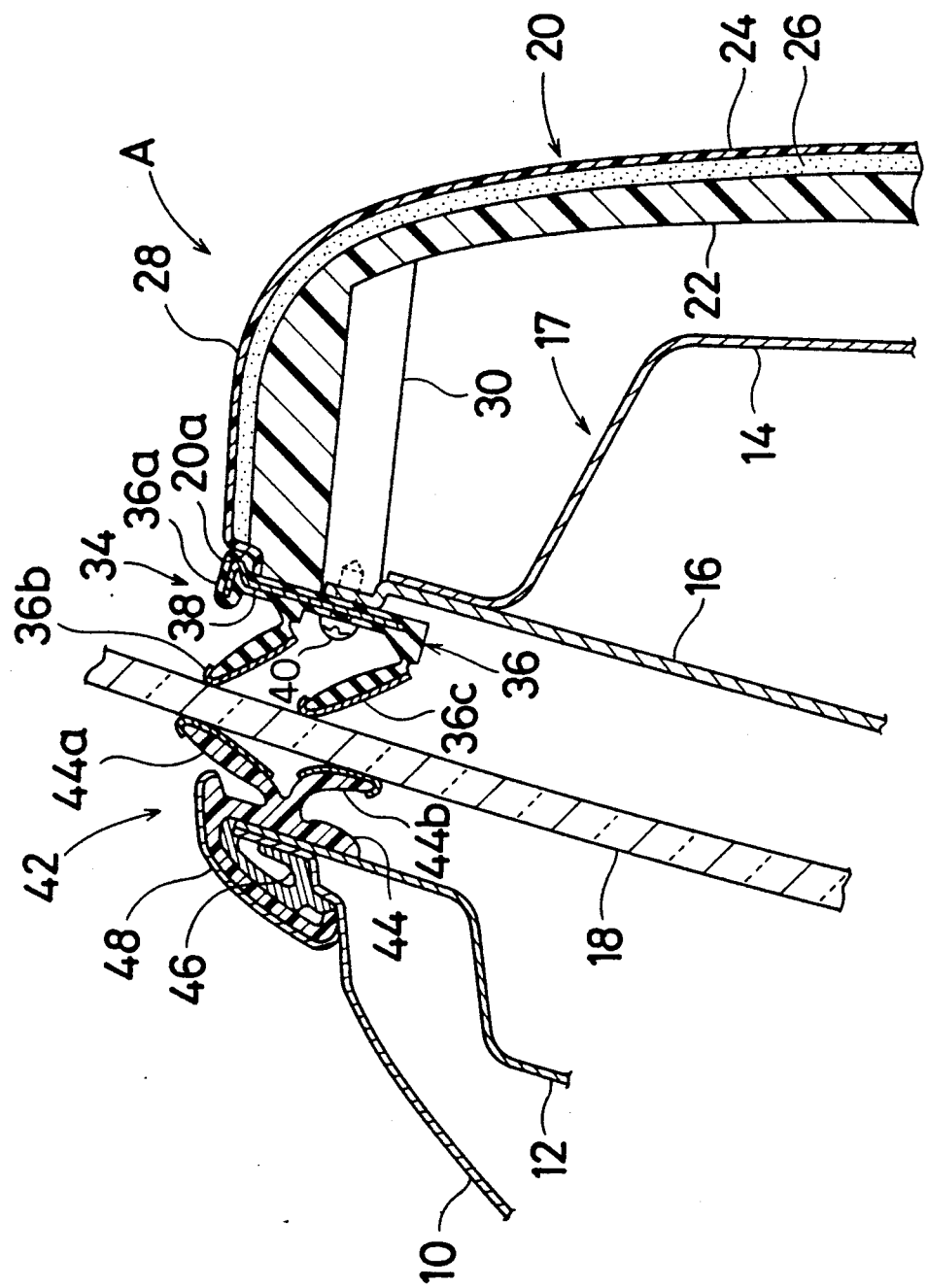
FIG. 2 is a vertical sectional view between thick-wall projecting parts of a trim for a vehicle of the present embodiment.
Figure 3:
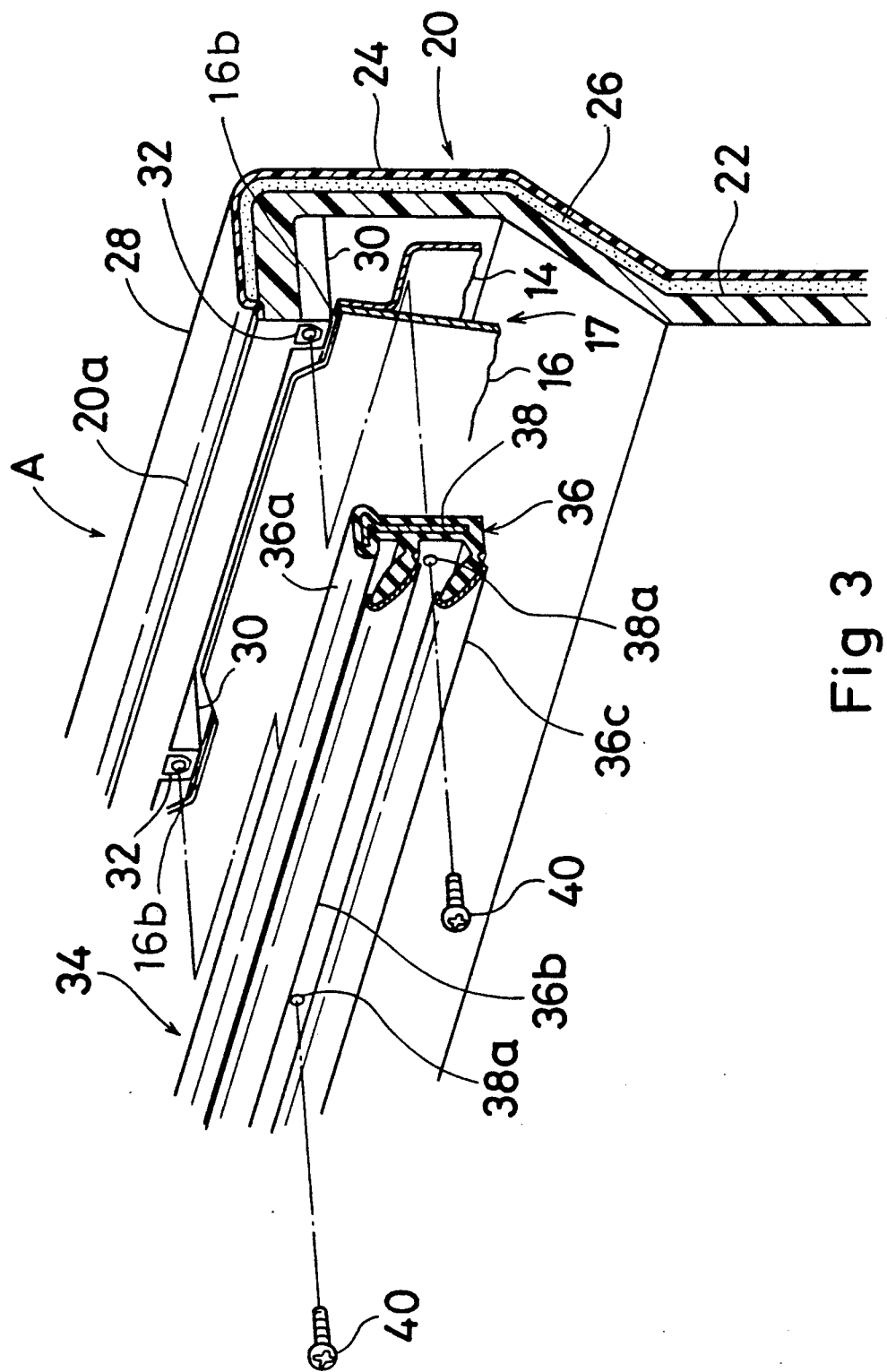
FIG. 3 is an exploded perspective view of a trim for a vehicle of the present embodiment.

FIGS. 1~3 illustrate a trim A for a vehicle of a first embodiment. The trim A is mounted to a door body 17 having an outer panel 10 provided in an outer surface of the door body 17, an outer reinforcing panel 12 for reinforcing the outer panel 10, an inner panel 14 provided in an inner surface of the door body 17, and an inner reinforcing panel 16 for reinforcing the inner panel 14. A door inner member, which is a door panel, is constructed by the above inner panel 14 and the inner reinforcing panel 16. A window glass 18 movable upwardly and downwardly is provided between the outer reinforcing panel 12 and the inner reinforcing panel 16.

The trim A for a vehicle comprises a trim body 20 constructing a body part. The trim body 20 comprises a padding material 22 consisted essentially of formed hard plastic and positioned in an outer side of a vehicle body, i.e., to the window glass 18 side, a cover 24 positioned in an inner or exposed side of the padding material 22 and consisted essentially of soft vinyl chloride, and a cushion 26 positioned between the padding material 22 and the cover 24 and consisted essentially of expandable hard urethane resin which is already expanded and hardened. The trim body 20 comprises a flange part 28 projecting outwardly at an upper end thereof and extending in the longitudinal direction of the vehicle body along the upper end of the vehicle body.

The trim body 20 is obtained by the following process. First, a sheet member consisted essentially of the cover 24 and the cushion 26 adhered on the back surface of the cover 24 is formed into a given shape in order to obtain a cover layer. Thereafter, this cover layer is set in a cavity of the forming die. Next, expandable hard resin is filled into the back surface of the cushion 26 of the cover layer in the cavity. The padding material 22 is formed by expanding the expandable hard resin. Thus, the trim body 20 having the padding material 22, the cover 24, and cushion 26, those are formed integrally, is formed.

Instead of the above process, the trim body 20 can be obtained by adhering the cushion 26 on the padding material 22, which is formed in a given shape, and adhering the cover 24 on the cushion 26.

A plurality of thick-wall projecting parts 30, projecting downwardly, are provided under the flange part 28 of the trim body 20 along an upper end of the trim body 20, which means in a longitudinal direction of a vehicle body. One end of each thick-wall projecting part 30 is supported by a concave or recessed part 16b provided at an upper end of the inner reinforcing panel 16. By this, the position of the trim A for a vehicle in the lower direction with respect to a door body 17 is determined.

Figure 4:
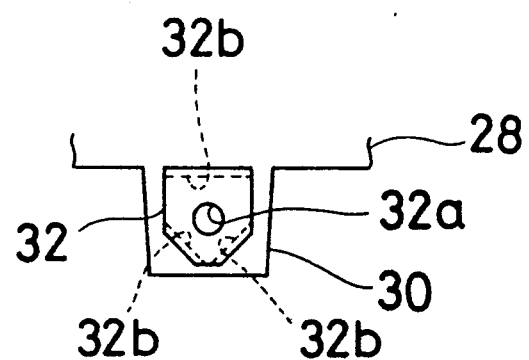
FIG. 4 is an enlarged front view of a thick-wall projecting part of a trim for a vehicle of the present embodiment.

On the window glass 18 side of the thick-wall projecting parts 30, mounting metals 32, each is as shown enlargely in detail in FIG. 4, are formed integrally with the trim body 20 when the trim body 20 is formed. Each mounting metal 32 comprises a threaded hole 32a formed at the center thereof and three bent parts 32b formed on the periphery, each bent part is bent into the thick-wall projecting part 30 side. Since those three bent parts 32b are inserted into the thick-wall projecting part 30, the mounting metal 32 will be prevented from rotating and falling off from the trim body 30.

An inner weatherstrip 34 is provided in an outer side of an upper end of the trim body 20. This inner weatherstrip 34 comprises a weatherstrip body 36 of a rubber. A core member 38 of a sheet metal and the like is formed integrally with the weatherstrip body 36 by an insert forming. The weatherstrip 36 is thereby reinforced by the core member 38. The weatherstrip body 36 comprises an upper-end projecting part 36a projecting inwardly and outwardly at an upper end thereof for reinforcing the upper end, an upper lip 36b, and a lower lip 36c, both lips projecting outwardly at an upper position and a lower position respectively under the upper-end projecting part 36a. The upper and lower lips 36b and 36c of a blade configuration perform as so-called seals, which means they prevent wind, rain, and dust from coming into the space between the weatherstrip body 36 and the window glass 18. An inner end of the upper-end projecting part 36a of the weatherstrip 36 contacts with a shoulder part 20a provided at the end of the flange part 28 of the trim body 20.

A plurality of penetrating holes 38a are formed in the care member 38 in response to the threaded holes 32a of the mounting metals 32 inserted into the thick-wall projecting part 30 of the trim body 20. Each bolt member 40 is screwed into the penetrating hole 38a of the care member 38 and the threaded hole 32a of the mounting metal 32, wherein the inner end of the upper-end projecting part 36a of the weatherstrip body 36 contacts with the shoulder part 20a of the trim body 20, i.e., an inner surface (back surface) of the weatherstrip 34 contacts with the ends of the flange parts 28 and the thick-wall projecting parts 30. Thus, the weatherstrip 34 is mounted to an outer end surface of the flange part 28 of the trim body 20 by bolt members 40 screwed into the thick-wall projecting parts 30 from outer side.

As shown in FIG. 2, the inner surface of the weatherstrip body 36 contacts with the outer surface of the inner reinforcing panel 16 between the thick-wall projecting parts 30. The position of the trim A for a vehicle to the inner direction with respect to the inner reinforcing panel 16 can be determined.

An outer weatherstrip 42 is disposed at an upper end of both the outer panel 10 and the outer reinforcing panel 12. The outer weatherstrip 42 comprises a weatherstrip body 44 of a rubber, a padding material 46 formed integrally with the weatherstrip body 44 inside thereof, and a cover member 48 for covering the outer surface of the weatherstrip body 44. The weatherstrip body 44 comprises an upper lip 44a and a lower lip 44b projecting inwardly at an upper position and a lower position respectively. Those the upper and lower lips 44a and 44b of a blade configuration perform as seals between the weatherstrip body 44 and the window glass 18.

As mentioned above, a mounting part bending downwardly from the end of the flange part 28 is not required in the present embodiment since the weatherstrip 34 is mounted to the thick-wall projecting part 30 by bolt members. Therefore, an undercut part is not formed at the end of the trim body 20 and an insert die is not required in the forming die neither. Consequently, the trim body 20 is formed accurately and the cost for the forming die is lowered.

The weatherstrip 34 is mounted to the thick-wall projecting parts 30 by bolt members from outer side and therefore, mounting operation is not required at the undercut part. This simplifies the mounting operation of the weatherstrip 36 to the trim body 20.

In the present embodiment, a position of the trim A for a vehicle to the inner direction with respect to the door body 17 is determined since the inner surface of the weatherstrip body 36 fixed to the thick-wall projecting parts 30 contacts with the outer surface of an upper end of the inner reinforcing panel. Thus, higher dimensional accuracy between the weatherstrip 36 and the inner surface of the window glass 18 is obtained and also the seal of the weatherstrip 34 to the window glass 18 is improved.

Also, in the present invention, strength of the mounting part of the weatherstrip 34 to the trim A for a vehicle is improved since the thick-wall projecting part 30 which continues to be a padding material 22 of the trim body 20 is formed at the flange part 28.

Figure 5:
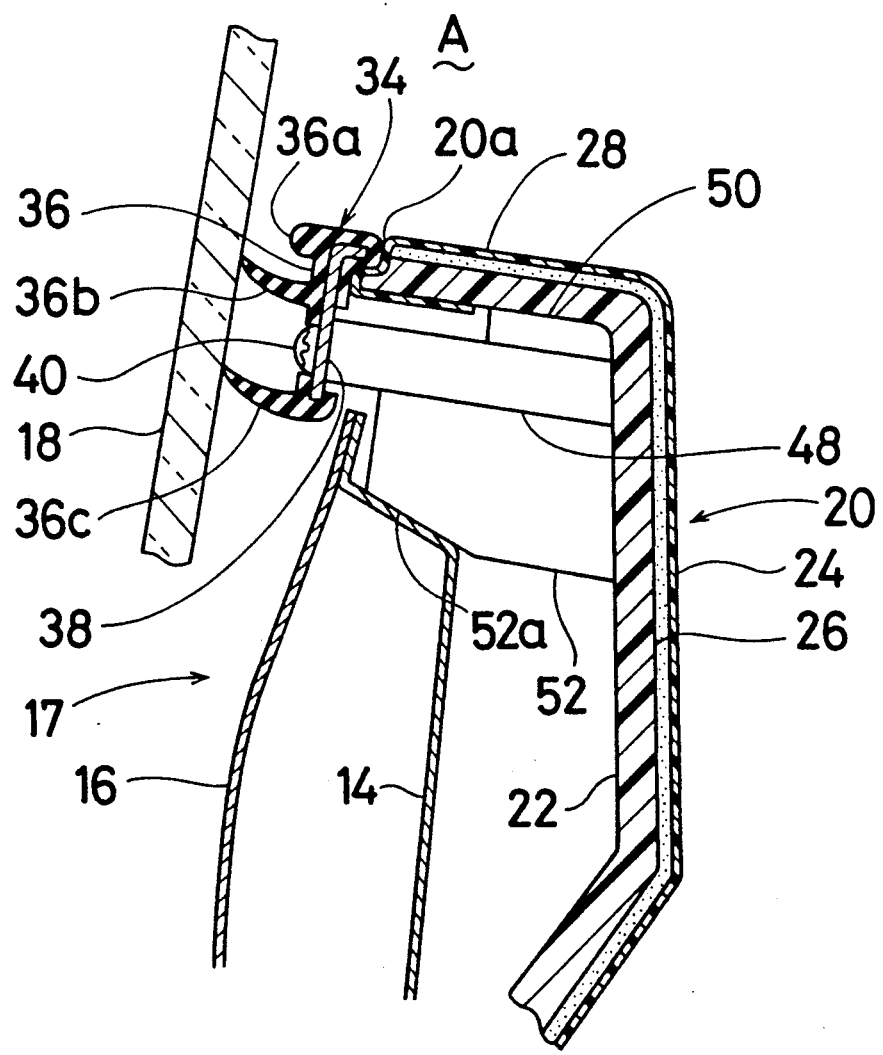
FIG. 5 is a vertical side view between boss parts of a trim for a vehicle of the present embodiment.
Figure 6:
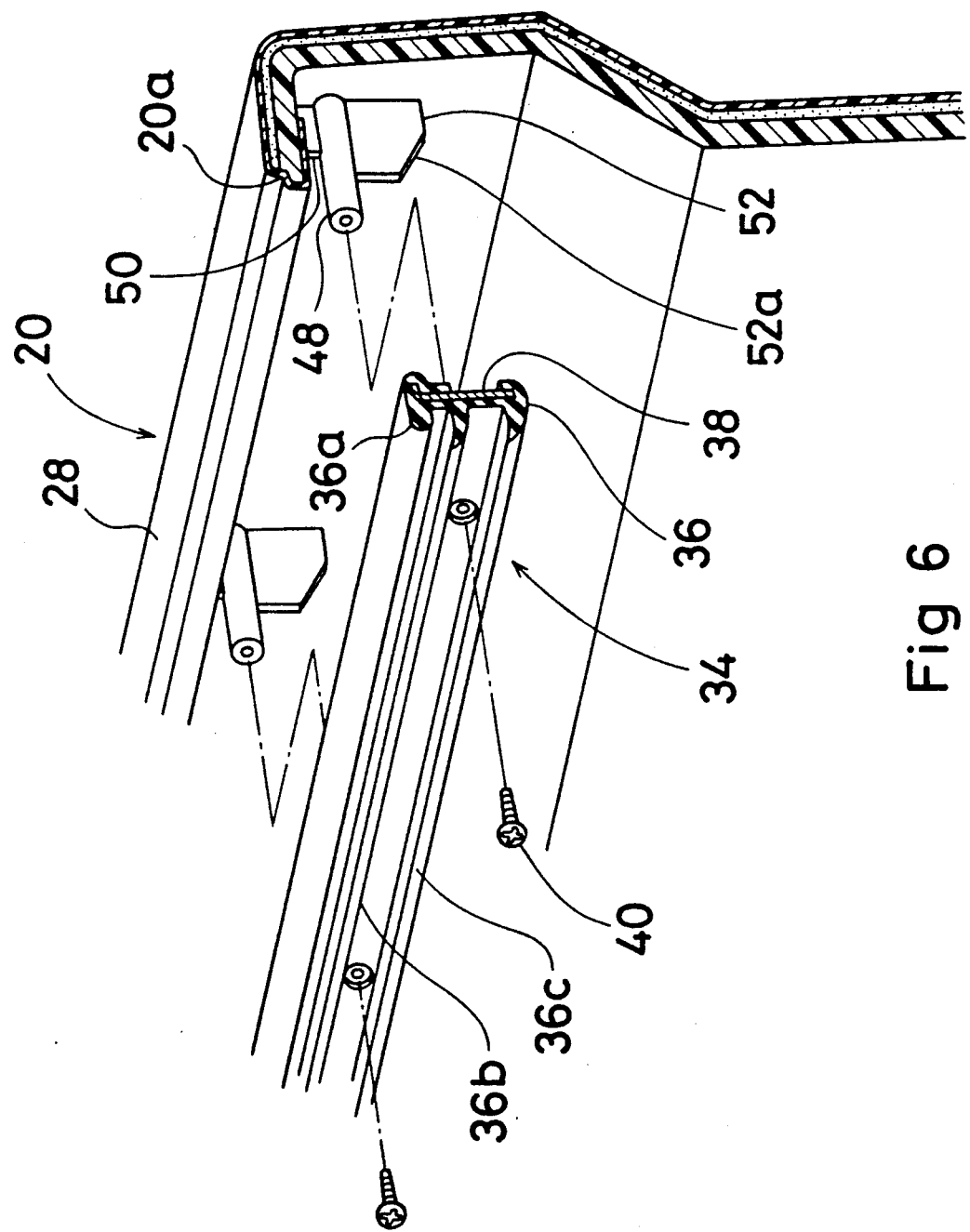
FIG. 6 is an exploded perspective view of a trim for a vehicle of a modified embodiment.

FIGS. 5 and 6 show a modified embodiment of the present invention. Same reference numerals are used for the identical parts in this modified embodiment in order to avoid repeating the same description.

In this modified embodiment, boss parts 48 of a cylindrical configuration projecting outwardly are provided under the flange part 28 of the trim body 20 with a space between the boss parts 48 and the flange part 28 and with proper intervals between the boss parts along the upper end of the trim body 20. An upper rib 50 and a lower rib 52 are provided on an upper position and a lower position of the boss part 48 respectively. Both upper and lower ribs connect each boss part 48 to the padding material 22 to strengthen the boss part 48. The trim A for a vehicle is determined its position in a downward direction with respect to the door body 17 by that each inclined part 52a formed at lower end of the lower rib 52 contacts with the upper surface of the inner panel 14.

The boss parts 48 and the upper and lower ribs 50 and 52 can be formed integrally with the padding material 22 by an injection forming. Or if the padding material is expandable hard material, the boss parts 48 and the upper and lower ribs 50 and 52 can be formed by inserting them to a padding material 22, which is an insert forming.

FIG. 6 shows a way to mount the weatherstrip 34 of the modified embodiment to the trim body 20. The weatherstrip 34 is mounted to the boss part 48 by bolt members 40 penetrating the weatherstrip body 36 between the upper and lower lips 36b and 36c, wherein the inner end of the upper-end projecting part 36a of the weatherstrip 36 contacts with the shoulder part 20a of the trim body 20.

What is claimed is:

1. A trim for a door panel of a vehicle having a plurality of spaced apart recesses formed in an upper portion thereof, said trim comprising a trim body and a weatherstrip disposed at an outer side of an upper end of said trim body and having a lip in contact with an inner surface of a window glass, said trim body having a flange part, projecting outwardly and extending along the upper end of said trim body at the upper end of said trim body, a plurality of boss parts, formed integrally with said trim body under said flange part and spaced along the upper end of said trim body with the spacing of said boss parts corresponding to the spacing of the recesses in the door panel, wherein said weatherstrip is fixed to said boss parts by bolt members so that an inner surface of said weatherstrip contacts with both an outer end of said flange part and outer ends of said boss parts, and a lower surface of each of said boss parts are supported by a respective recess in the upper portion of the door panel which underlies said trim body.

2. A trim for a vehicle as claimed in claim 1, wherein said trim body includes a padding material, formed essentially of a plastic, and a cover adhered on an exposed surface of said padding material, said boss parts are formed essentially of the same material as said padding material and formed integrally with an under surface of said padding material of said flange part without any member therebetween.

3. A trim for a vehicle as claimed in claim 1, wherein mounting members, each having a threaded hole, are inserted in ends of said boss parts and said bolt members are screwed into said threaded holes of said mounting members.

4. A trim for a vehicle as claimed in claim 1, wherein at least a portion of said inner surface of said weatherstrip is in contact with an outer surface of the upper end of the door panel.

5. A trim for a vehicle comprising a trim body and a weatherstrip disposed at an outer side of an upper end of said trim body and having a lip in contact with an inner surface of a window glass, said trim body having a flange part, projecting outwardly and extending along the upper end of said trim body at the upper end of said trim body, a plurality of boss parts, formed integrally with said trim body under said flange part and spaced along the upper end of said trim body, and a plurality of rib members, wherein said weatherstrip is fixed to said boss parts by bolt members so that an inner surface of said weatherstrip contacts with both an outer end of said flange part and outer ends of said boss parts, and said trim body includes a padding material, formed essentially of a plastic, and a cover adhered on an exposed surface of said padding material, said boss parts are formed essentially of the same material as said padding material and at least an underside of each of said respective boss parts are formed integrally with an under surface of said padding material of said flange part by way of a respective one of said plurality of rib members.

6. A trim for a vehicle as claimed in claim 5, wherein said plurality of ribs are formed integrally with said trim body and projecting outwardly therefrom, with an under surface of each of said ribs contacting an upper end of a door panel which underlies said trim body.

* * * * *

UNITED STATES PATENT AND TRADEMARK OFFICE
CERTIFICATE OF CORRECTION

PATENT NO. : 5,170,586
DATED : December 15, 1992
INVENTOR(S) : Katsunari OSE et al.

It is certified that error appears in the above-identified patent and that said Letters Patent is hereby corrected as shown below:

Title Page:
Item: [73] Assignees: Mazda Motor Corporation,
Hiroshima-ken, Japan and Nishikawa Kasei Co., Ltd.,
Hiroshima-ken, Japan Signed and Sealed this Twentieth Day of September, 1994

Attest:

BRUCE LEHMAN

*Attesting Officer* — *Commissioner of Patents and Trademarks*